US008100696B2

(12) United States Patent
Wezurek et al.

(10) Patent No.: US 8,100,696 B2
(45) Date of Patent: Jan. 24, 2012

(54) SELF-RESCUER TRAINING DEVICE

(75) Inventors: Horst Wezurek, Ratzeburg (DE); Miriam Dittrich, Bad Schwartau (DE)

(73) Assignee: Dräger Safety AG & Co. KGaA, Lübeck (DE)

(*) Notice: Subject to any disclaimer, the term of this patent is extended or adjusted under 35 U.S.C. 154(b) by 1204 days.

(21) Appl. No.: 11/737,306

(22) Filed: Apr. 19, 2007

(65) Prior Publication Data

US 2008/0085498 A1 Apr. 10, 2008

(30) Foreign Application Priority Data

Sep. 22, 2006 (DE) ......................... 10 2006 044 951

(51) Int. Cl.
*G09B 25/00* (2006.01)

(52) U.S. Cl. ....................................................... 434/390

(58) Field of Classification Search ............. 128/201.13; 434/390

See application file for complete search history.

(56) References Cited

U.S. PATENT DOCUMENTS 3,594,990 A * 7/1971 Hawley ........................... 96/115
3,625,866 A * 12/1971 Conde ............................. 502/68
4,038,050 A * 7/1977 Lowther .............................. 95/1
4,325,364 A * 4/1982 Evans ...................... 128/201.13
4,597,434 A * 7/1986 Menelly .......................... 165/10
4,752,310 A * 6/1988 Maier-Laxhuber et al. ........ 62/4
5,996,580 A * 12/1999 Swann ..................... 128/206.17

FOREIGN PATENT DOCUMENTS

DE 1 942 806 7/1966

* cited by examiner

*Primary Examiner* — Xuan Thai
*Assistant Examiner* — Evan Page
(74) *Attorney, Agent, or Firm* — McGlew and Tuttle, P.C.

(57) ABSTRACT

A training device for a self-rescuer is improved such that practical breathing parameters will become established. A granular filling of a material (7) is used that binds water molecules and generated heat of adsorption or heat of absorption in the process instead of an oxygen-releasing chemical.

19 Claims, 1 Drawing Sheet

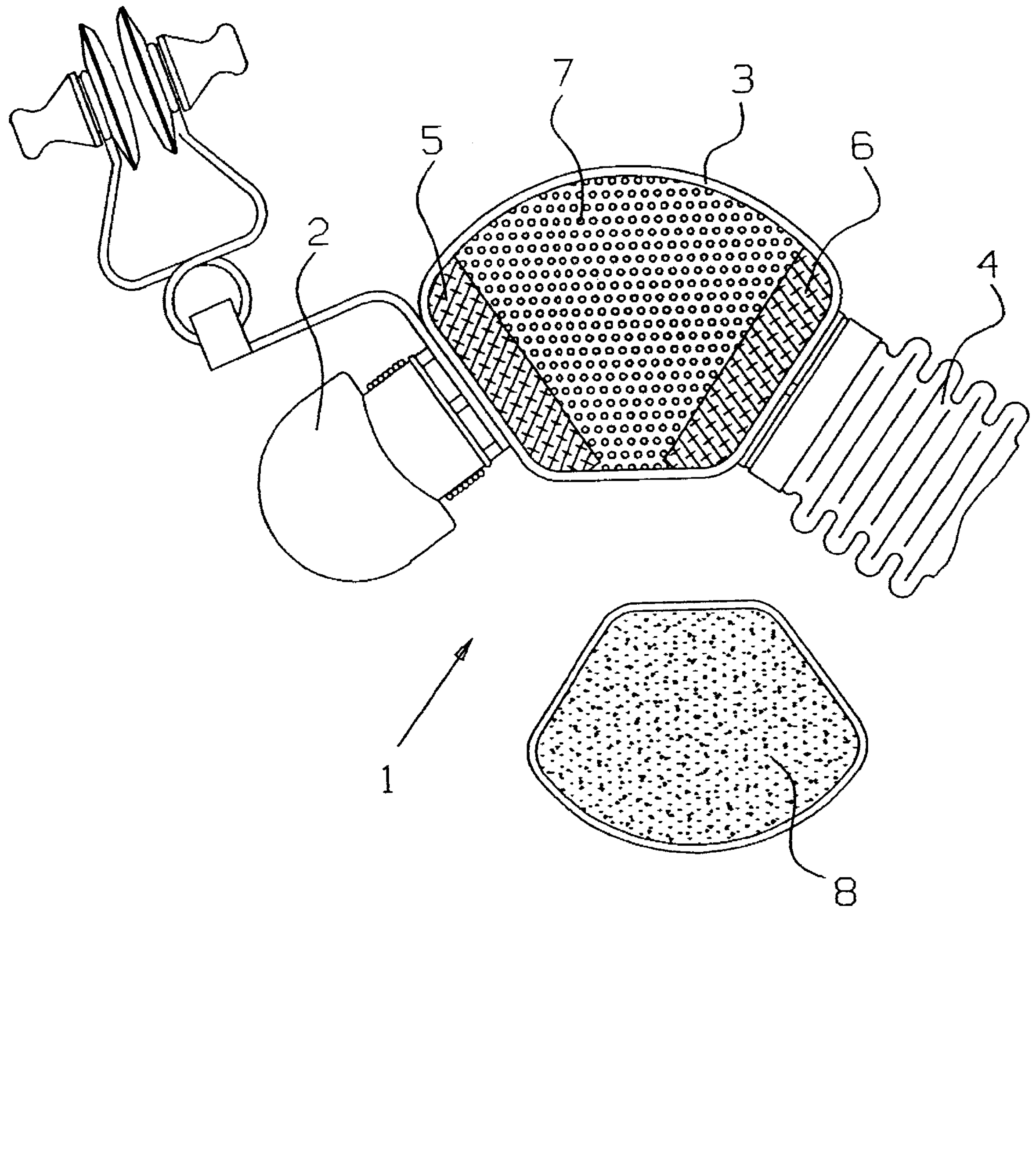
7
3
5
6
2
4
1
8

SELF-RESCUER TRAINING DEVICE

CROSS REFERENCE TO RELATED APPLICATIONS

This application claims the benefit of priority under 35 U.S.C. §119 of German Patent Application DE 10 2006 044 951.7 filed Sep. 22, 2006, the entire contents of which are incorporated herein by reference.

FIELD OF THE INVENTION

The present invention pertains to an improved training device for a self-rescuer and more particularly relates to a self-rescuer training device with a material not releasing oxygen in a granular filling in a container allowing practical breathing parameters to become established.

BACKGROUND OF THE INVENTION

In certain industrial areas, e.g., in mining or when entering closed spaces, the persons working there must carry oxygen self-rescuers with them in order to be able to escape from the area in case of an unbreathable atmosphere. These oxygen self-rescuers make it possible for the user to build up a breathing circuit, which operates independently from the ambient air, in a short time. The tidal volume must be collected for this in a breathing bag and carbon dioxide breathed out during each breath is bound chemically and oxygen taken up by the body is again introduced into the air. This is achieved with potassium dioxide ($KO_2$) in most oxygen self-rescuers of various manufacturers. $KO_2$ reacts with the moisture present in the expired air and in the released gaseous oxygen in the process. In addition, potassium hydroxide, which is an effective binder for carbon dioxide ($CO_2$) and reacts with the carbon dioxide to form potassium carbonate, is formed in the above-mentioned reaction.

To learn how to put on an oxygen self-rescuer in exercises, there is a "training device" for each model of oxygen self-rescuer. This training device contains all the functional parts that are necessary for the training, but no functional breathing air regenerating cartridges. This is not meaningful for cost reasons and because of the disposal, which becomes necessary. For simplicity's sake, the expired air is replaced with ambient air during each breath in training devices.

The trainees sometimes complain that they do not achieve any training effect in respect to the occurring airway resistance, the dryness of the regeneration air and the temperature that becomes established during breathing with real devices.

A self-rescuer training device, in which a granular filling consisting of ceramic bodies is provided in a container, through which the breathing air flows, is known from DE 19 42 806 U. A heating coil for heating the breathing air is arranged within the filling of ceramic bodies, which is used to store heat. The wall of the container is provided with an aluminum-lined asbestos layer on the inner side and the outer side for heat insulation against the environment.

A thermal switch, which interrupts the power supply in the form of a two-point controller when a predetermined temperature limit is exceeded, is used for the temperature control of the heating coil. The prior-art training device is suitable for possible applications only conditionally, because auxiliary electric power is necessary for operating the heating coil.

SUMMARY OF THE INVENTION

The basic object of the present invention is to improve a training device of the type mentioned such that breathing parameters similar to those occurring in practice will become established.

According to the invention, a self-rescuer training device is provided comprising a container connected to a breathing passage and a granular filling material. The granular filling material does not release oxygen. The material is disposed in the container. The material generates heat of adsorption or heat of absorption during the binding of water.

The present invention is based on selecting a material that generates heat of adsorption or heat of absorption during the binding of water while not using a material that releases oxygen. Suitable materials are desiccants such as $P_2O_2$, silica gel, $CaCl_2$, NaOH or KOH.

A granular filling consisting of a zeolite, whose pores have such a size that water molecules are bound to them, is an especially preferred suitable adsorption material for the training device.

A group of minerals having the formula $$M_{x/n}[(AlO_2)_x(SiO_2)_y].zH_2O$$

is called zeolites, wherein "M" denotes a metal, generally sodium.

Zeolites are chemically especially resistant, and two parameters determine their behavior as an adsorption agent, namely, the shape and the size of the pores as well as the negative charge in the pores. Small pores bind the water molecules more strongly than do large pores. Zeolites with a pore size of 3-4 Å are most suitable for binding water.

The heat released during the adsorption is utilized to heat the breathing gas. The amount of heat generated depends on the quantity of zeolite filled in and the moisture present in the expired air. Practical experiments have shown that the following breathing parameters become established in the device proposed according to the present invention containing approximately 50 g of adsorption agent during normal, deep breathing:

- Rise in the inspiration temperature from 37° C. to 43° C. during the first 10 minutes,
- inspiration/expiration resistance at −6/+6 hPa,
- perceptibly dry mucosa in the pharyngeal region.

This corresponds to the phenomena that occur during the respiration with a real oxygen self-rescuer during the first 10 minutes after putting on the device.

The inspiration and expiration resistances can be set to the desired range by selecting the particle size of the zeolite filling and additional filter elements such as particle filter, wire filter, glass fiber or cellulose nonwovens.

The solution according to the present invention makes it, moreover, possible for the training to have a fully realistic course, because no additional elements are attached to the training device and no power supply via cables is needed. The familiar training device is rather set up only with the simulator element instead of the otherwise mounted heat exchanger. Training devices with resistance, dryness and heat simulation do not differ externally and for the exercise to be performed from training devices without the simulation. Available training material such as videos or posters continue to be valid. Only the perception of the trainee corresponds to that of a real device during the initial phase.

The costs for the zeolite filling or a full simulator are relatively low (below 0.50 Euro), so that reprocessing is not necessary. Regeneration should definitely be possible by heating the zeolite to 300-400° C. and the material would thus again be sterile right away. It appears more meaningful and more practical in the training operation to dispose of the entire element after use.

Zeolites are not soluble in water, they are not combustible, and are not hazardous substances. No handling or protective instructions are to be followed. The material is nontoxic or harmful for health.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic view of the breathing connection of a training device, shown with the cover removed, the breathing connection acting as a simulator for the airway resistance and the heat of reaction of an oxygen self-rescuer.

DESCRIPTION OF THE PREFERRED EMBODIMENTS

Referring to the drawings in particular, the only FIGURE shows a detail of the breathing connection of a training device 1 as a simulator for the airway resistance and the heat of reaction of an oxygen self-rescuer. A mouthpiece or breathing passage 2 is connected to a breathing tube 4 via a container 3. The container 3 has dust filters 5, 6, which are each designed in the form of a particle filter. The dust filters 5, 6 are respectively disposed towards both the mouthpiece 2 and the breathing tube 4.

A granular filling of a zeolite 7 with a pore size of about 3 Å to 4 Å is located between the dust filters 5, 6, so that there are good adsorption properties for water molecules. The quantity of the filling is about 50 g. Heat simulation is possible with this quantity for about 10 minutes at a respiratory minute volume of about 30 L per minute. Adapting the quantity to other operating times and other desired inspiration temperatures is within the scope of the present invention. The container 3 is closed with a cover 8.

While specific embodiments of the invention have been shown and described in detail to illustrate the application of the principles of the invention, it will be understood that the invention may be embodied otherwise without departing from such principles.

What is claimed is:

1. A self-rescuer training device, comprising:
a container connected to a breathing passage; and
a granular filling material not releasing oxygen, said material being disposed in said container, said material generating heat of adsorption or heat of absorption during the binding of water, said material being a zeolite having pores of a size that water molecules are bound in them, said zeolite being selected from a group of minerals having the general formula $M_{x/n}[(AlO_2)_x(SiO_2)_y].zH_2O$, wherein "M" is a metal.

2. A self-rescuer training device in accordance with claim 1, wherein said metal is sodium.

3. A training device in accordance with claim 1, wherein:
the training device simulates an oxygen generating self-rescuer using potassium dioxide to react with moisture present in a user's expired air and creates gaseous oxygen, heat and dryness in the process;
said zeolite generates heat and dryness in an amount similar to the heat and dryness created by the potassium dioxide in the actual oxygen generating self regulator.

4. A training device in accordance with claim 3, wherein:
said zeolite generates heat and dryness during the binding of water in breathing gas, the generated heat and dryness being similar to a heat and dryness caused by the actual oxygen generating self-rescuer for a same amount of breathing gas.

5. A training device for oxygen generating self-rescuer that provides breathing gas to a user, the device comprising:
a mouthpiece transporting the breathing gas to and from the user;
a container connected to said mouthpiece;
a breathing tube providing a supply of the breathing gas to and from said container, said container passing the breathing gas between said breathing tube and said mouthpiece;
a single type of granular filling material being disposed in said container and in contact with the breathing gas, said single type of material not releasing oxygen when in contact with the breathing gas, said single type of material generating heat for heating the breathing gas when said material binds with water in the breathing gas, said type of material being of a type to generate the heat in an amount similar to an amount of heat generated in the actual self rescuer for a same amount of breathing gas, said amount of said type of material also drying the breathing air in an amount similar to a drying caused by the actual self rescuer for a same amount of breathing gas.

6. A self-rescuer training device in accordance with claim 5, wherein the material is a desiccant.

7. A self-rescuer training device in accordance with claim 6, wherein the material is one or more of $P_2O_2$, silica gel, $CaCl_2$, NaOH or KOH.

8. A self-rescuer training device in accordance with claim 5, wherein the material is one or more zeolites having pores of a size that water molecules are bound in them.

9. A self-rescuer training device in accordance with claim 8, wherein said one or more zeolites are selected from a group of minerals having the general formula $M_{x/n}[(AlO_2)_x(SiO_2)_y].zH_2O$, wherein "M" is a metal.

10. A self-rescuer training device in accordance with claim 9, wherein said metal is sodium.

11. A self-rescuer training device in accordance with claim 8, wherein the pore size is in a range of 3-4 Å.

12. A self-rescuer training device in accordance with claim 8, wherein the quantity of said zeolite is in a range of 40 g to 60 g.

13. A training device in accordance with claim 5, wherein:
said material is a zeolite selected from a group of minerals having the general formula $M_{x/n}((AlO_2)_x(SiO_2)_y).zH_2O$, wherein "M" is a metal.

14. A training device in accordance with claim 13, wherein:
said metal is sodium.

15. A training device in accordance with claim 14, wherein:
said zeolite has a pore size in a range of 3-4 Å;
an amount of said zeolite is in a range of 40 g to 60 g;
said material generates the heat from a heat of adsorption or heat of absorption during the binding of water.

16. A training device in accordance with claim 5, wherein:
said material generates the heat from a heat of adsorption or heat of absorption during the binding of water.

17. A training device in accordance with claim 5, wherein:

the oxygen generating self-rescuer uses potassium dioxide to react with moisture present in a user's expired air and creates gaseous oxygen, heat and dryness in the process;

said single type of material is a zeolite selected from a group of minerals having the general formula $M_{x/n}((AlO_2)_x(SiO_2)_y).zH_2O$, wherein "M" is a metal, and generates heat and dryness in an amount similar to the heat and dryness created by the potassium dioxide in the actual oxygen generating self regulator.

18. A training device for an oxygen self-rescuer that provides breathing gas to a user from a user's exhaled breath, the device comprising:

a mouthpiece transporting the breathing gas to and from the user;

a container connected to said mouthpiece;

a breathing tube providing a supply of the breathing gas to and from said container, said container passing the breathing gas between said breathing tube and said mouthpiece;

a single type of granular filling material being disposed in said container and in contact with the breathing gas, said type of material not releasing oxygen when in contact with the breathing gas, said single type of material generating heat and dryness in the breathing gas by reaction with water in the breathing gas, the generated heat and dryness being similar to a heat and dryness caused by the actual oxygen self-rescuer for a same amount of breathing gas.

19. A training device in accordance with claim 18, wherein:

the oxygen self-rescuer uses potassium dioxide to react with moisture present in a user's expired air, and creates gaseous oxygen, heat and dryness in the process;

said single type of material is a zeolite selected from a group of minerals having the general formula $M_{x/n}((AlO_2)_x(SiO_2)_y).zH_2O$, wherein "M" is a metal, and generates heat and dryness in an amount similar to the heat and dryness created by the potassium dioxide in the actual oxygen self regulator.

* * * * *